US010902146B2

(12) United States Patent
Deering et al.

(10) Patent No.: US 10,902,146 B2
(45) Date of Patent: Jan. 26, 2021

(54) METHOD AND COMPUTING DEVICE FOR GATING DATA BETWEEN WORKSPACES

(71) Applicant: WORKIVA INC., Ames, IA (US)

(72) Inventors: Hannah Deering, Ames, IA (US); Levi Nichols, Ankeny, IA (US); Roseanne Streit, Phoenix, AZ (US)

(73) Assignee: WORKIVA INC., Ames, IA (US)

( * ) Notice: Subject to any disclaimer, the term of this patent is extended or adjusted under 35 U.S.C. 154(b) by 0 days.

(21) Appl. No.: 16/357,973

(22) Filed: Mar. 19, 2019

(65) Prior Publication Data

US 2020/0302079 A1 Sep. 24, 2020

(51) Int. Cl.

*G06F 21/62* (2013.01)
*G06F 16/903* (2019.01)
*G06F 9/54* (2006.01)
*G06F 16/9038* (2019.01)
*G06F 40/18* (2020.01)

(52) U.S. Cl.

CPC .......... *G06F 21/6227* (2013.01); *G06F 9/542* (2013.01); *G06F 16/9038* (2019.01); *G06F 16/90335* (2019.01); *G06F 40/18* (2020.01)

(58) Field of Classification Search

USPC .................................................. 707/738, 783
See application file for complete search history.

(56) References Cited

U.S. PATENT DOCUMENTS 8,959,115 B2 2/2015 Marathe
8,966,189 B2 2/2015 Rantanen
9,430,662 B2 8/2016 Giambiagi et al.
9,706,002 B2 7/2017 Kaplinger et al.
9,798,889 B1 10/2017 Karpel et al.
9,805,209 B2 10/2017 Naglost et al.
9,948,592 B1 * 4/2018 Collins et al. .......... G06F 15/16
10,001,913 B2 6/2018 von Muhlen et al.
10,037,339 B1 7/2018 Kleinpeter et al.
2011/0055250 A1 * 3/2011 Nandy et al. ......... G06F 16/248 707/769
2012/0317239 A1 12/2012 Mulder et al.

(Continued)

OTHER PUBLICATIONS

Microsoft Corporation, "Get notified when members of your team update your shared file," retrieved from internet website: https://support.office.com/en-us/article/get-notified-when-members-of-your-team-update-your-shared-file-9cc94893-02d5-4d96-9b3f-8b9414d5047a, 2019, 4 pages.

*Primary Examiner* — Muluemebet Gurmu
(74) *Attorney, Agent, or Firm* — Faegre Drinker Biddle & Reath LLP

(57) ABSTRACT

A method for gating data between workspaces involves a first computing device receiving, from a first user via a second computing device, a request to share a set of data with a second user; copying the set of data from a first data structure to a second data structure; receiving, from the second user via a second computing device, a request to display the set of data; in response to the request from the first user and the request from the second user, displaying the set of data on the third computing device, wherein the displayed set of data includes a value; receiving, from the first user via the second computing device, an update of the value; receiving, from the second user via the third computing device, an acceptance of the update; and displaying the updated value in place of the value on the third computing device.

13 Claims, 14 Drawing Sheets

(56) References Cited

U.S. PATENT DOCUMENTS

2014/0180438 A1* 6/2014 Hodges et al. ... H04M 1/72572
2015/0074508 A1* 3/2015 Vagell .................... G06F 17/24 715/230
2016/0232365 A1 8/2016 Oh et al.
2016/0315923 A1* 10/2016 Riscombe-Burton et al. .............. H04L 29/06
2017/0220546 A1 8/2017 Codrington et al.
2017/0344563 A1 11/2017 Kamath
2018/0034824 A1* 2/2018 Maycotte et al. ...... H04L 29/06
2018/0150650 A1 5/2018 Sauders et al.
2018/0157467 A1 6/2018 Stachura
2018/0189369 A1* 7/2018 Baek et al. ............ G06F 17/30

* cited by examiner

300

File Edit Data View

Publish Undo Redo Republish Update

302

304

| | A | B | C |
|---|---|---|---|
| 1 | | June 30, 2013 | June 30, 2012 |
| 2 | | | |
| 3 | Revenue | | |
| 4 | Products | 649,865 | 838,813 |
| 5 | Services and Support | 47,642 | 48,444 |
| 6 | Total Revenue | 697,507 | 887,257 |
| 7 | Cost of Revenue | | |
| 8 | Products | 49,365 | 84,623 |
| 9 | Services and Support | 15,682 | 26,221 |
| 10 | Total Cost of Revenue | 65,047 | 110,844 |
| 11 | Gross Profit | 632,460 | 776,413 |

FIG. 3A

METHOD AND COMPUTING DEVICE FOR GATING DATA BETWEEN WORKSPACES

TECHNICAL FIELD

The disclosure relates generally to data sharing on multi-user systems and, more particularly, to a method and computing device for gating data between workspaces.

BACKGROUND

Cloud-based software solutions have nearly overtaken locally-networked solutions in the marketplace. Such solutions allow businesses to set up all of the functionality of a local network, complete with dedicated application servers and multiple mechanisms for collaboration, without having to invest in the hardware and personnel needed to maintain an actual network. Like a traditional network, however, it is important for businesses to maintain security and data integrity. One mechanism for accomplishing this is to organize users into groups, in which users within a particular group are permitted to share data freely, but are restricted from sharing data outside of the group.

DRAWINGS

While the appended claims set forth the features of the present techniques with particularity, these techniques may be best understood from the following detailed description taken in conjunction with the accompanying drawings of which:

Figure 3B:
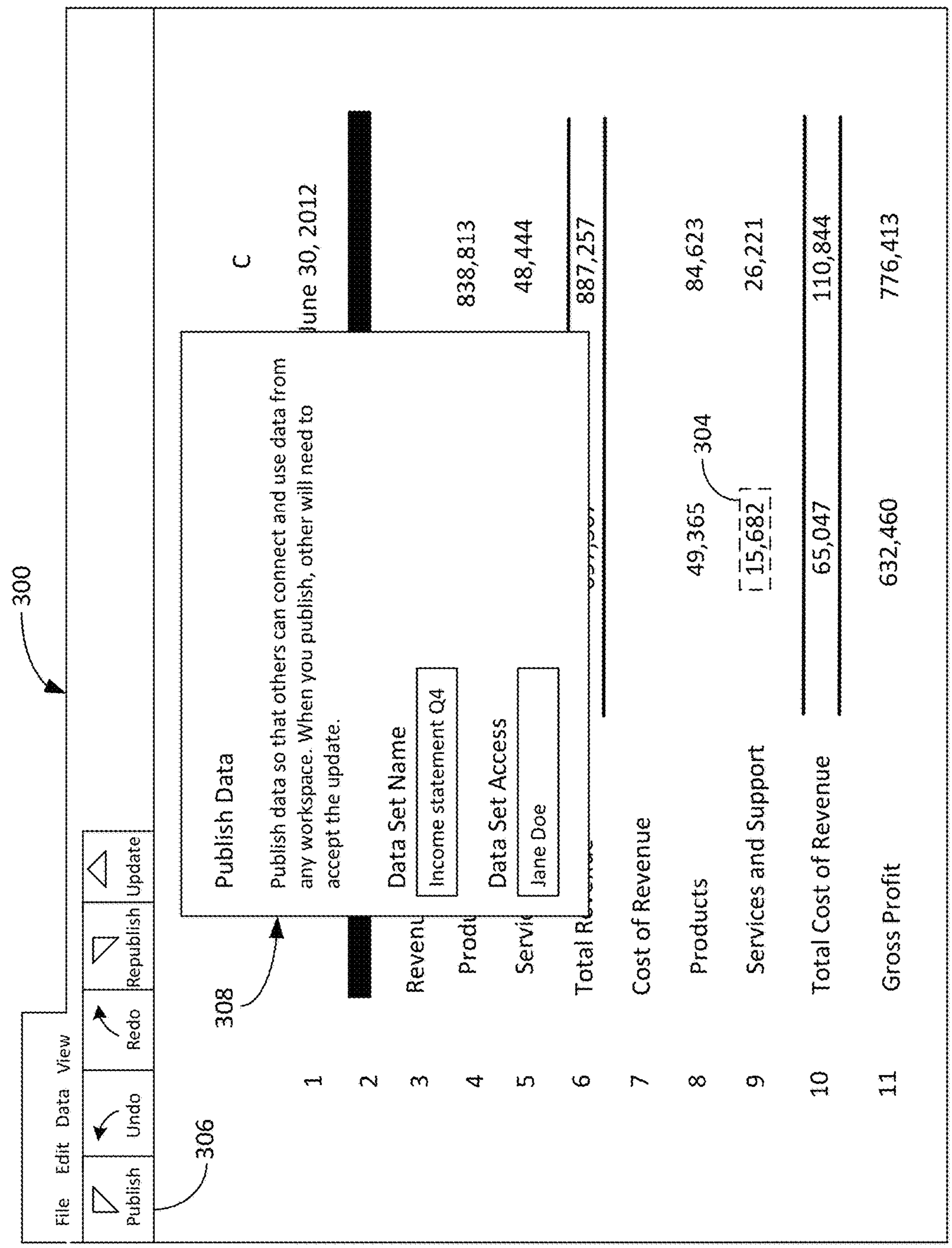
Figure 3C:
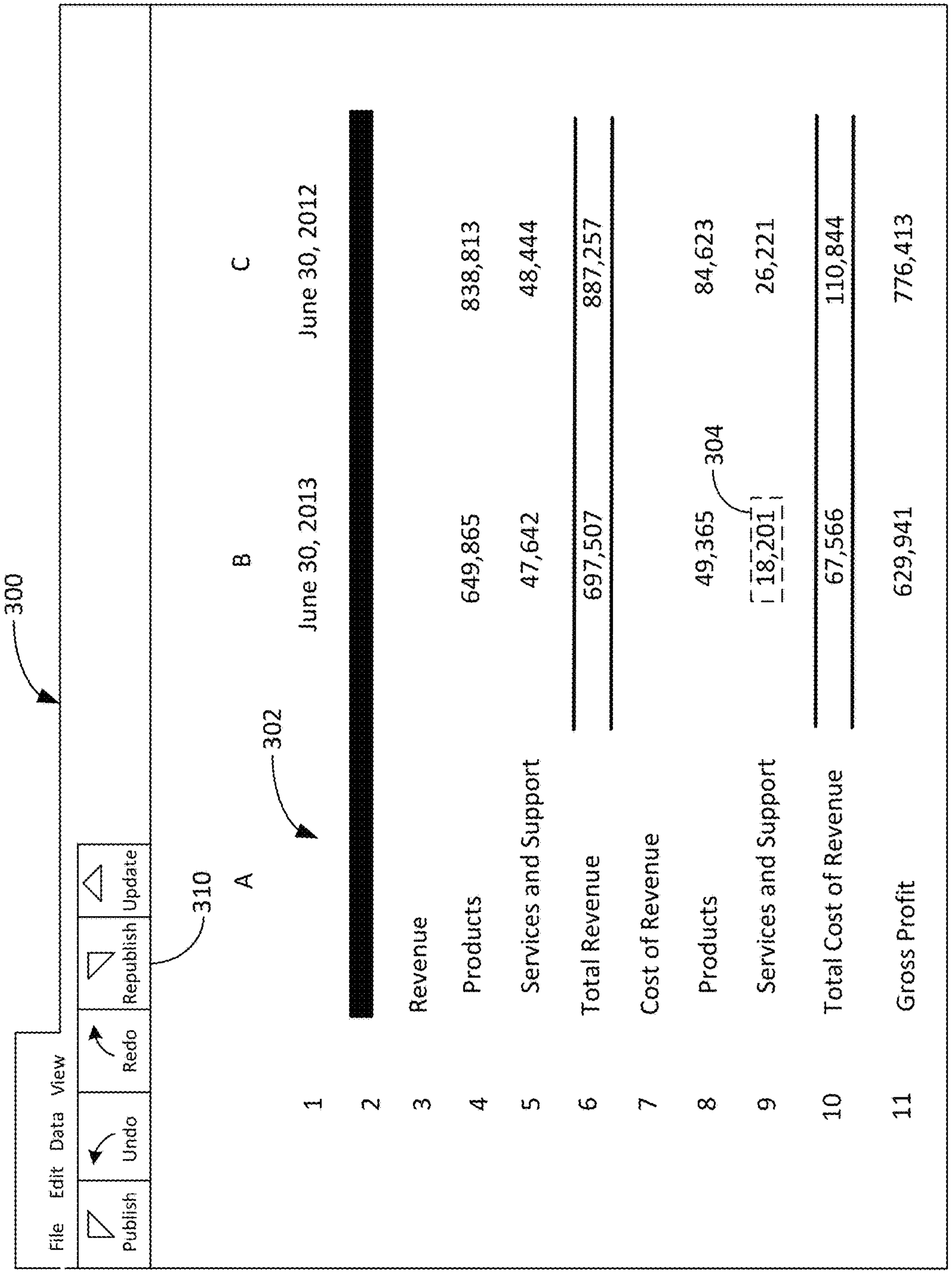

FIG. 3A, FIG. 3B, and FIG. 3C illustrate a user interface implemented according to an embodiment.

FIG. 4A, FIG. 4B, FIG. 4C, FIG. 4D, FIG. 4E, and FIG. 4F illustrate another user interface implemented according to an embodiment.

Figure 5:
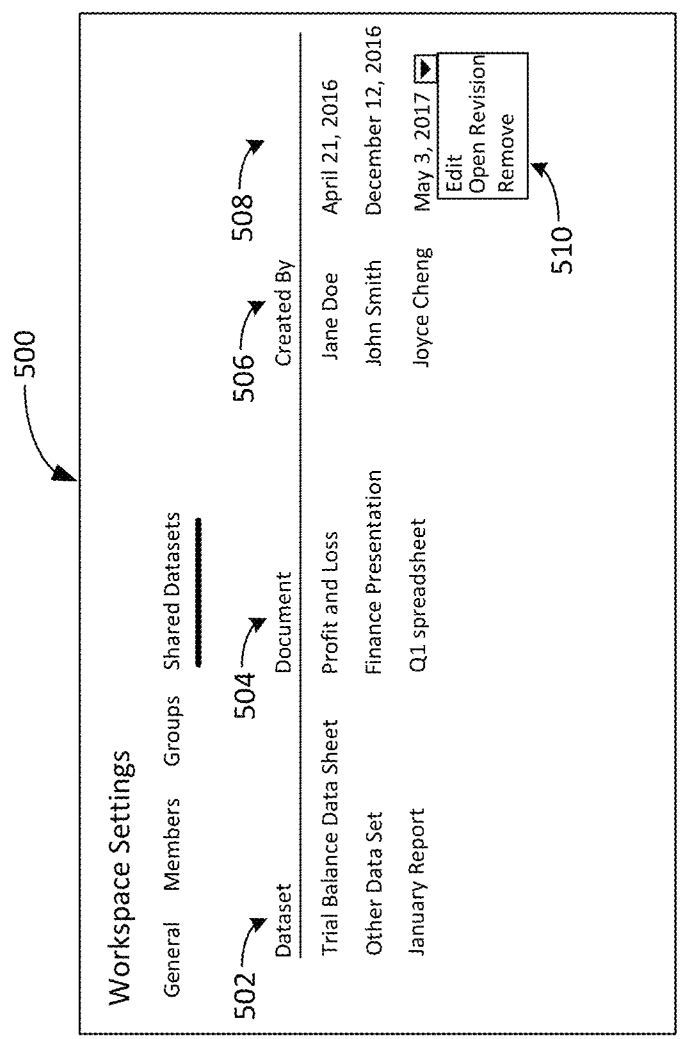

FIG. 5 illustrates an example of a history panel implemented according to an embodiment.

Figure 6:
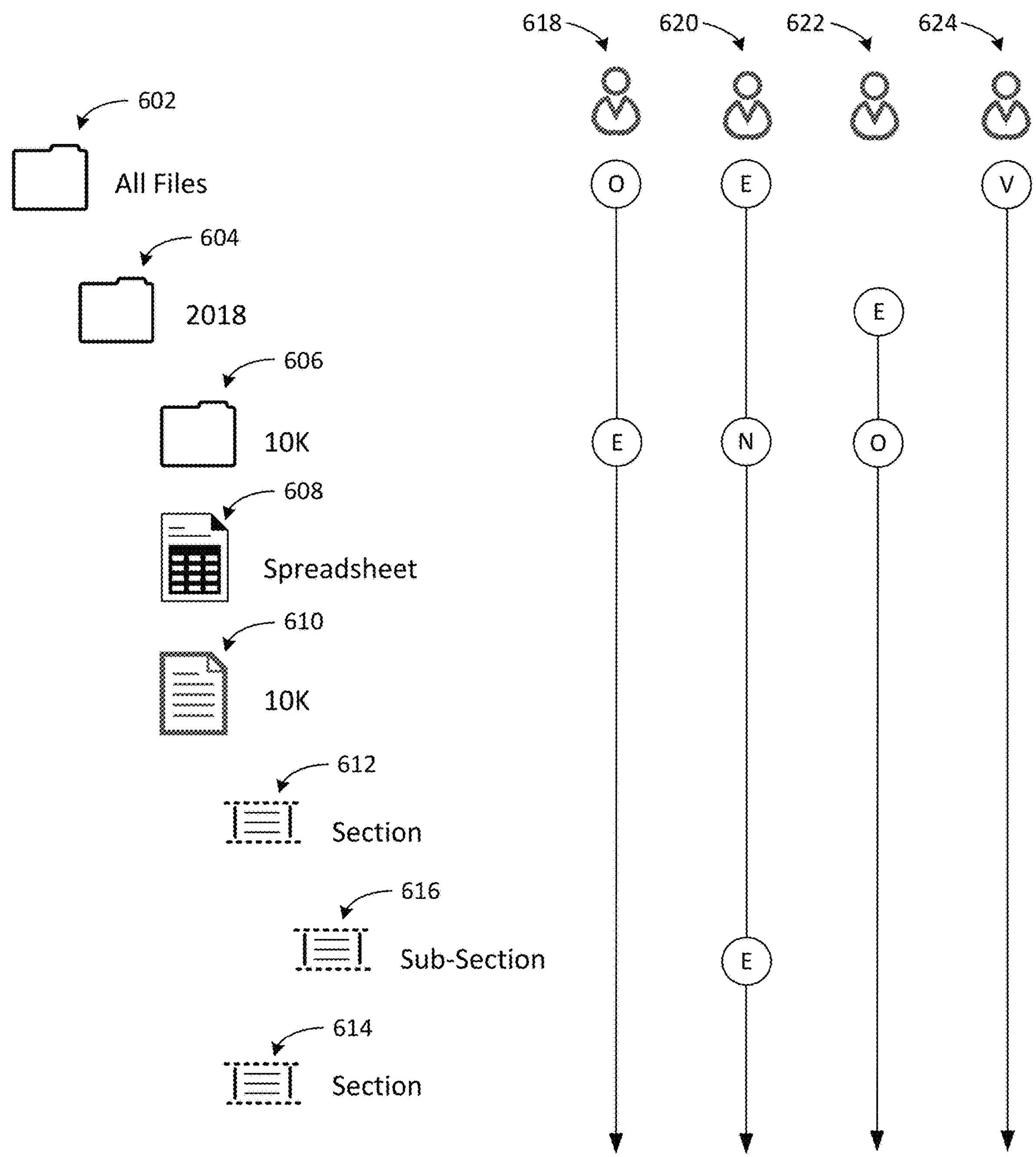

FIG. 6 illustrates an example of a permissioning scheme implemented according to an embodiment.

Figure 7:
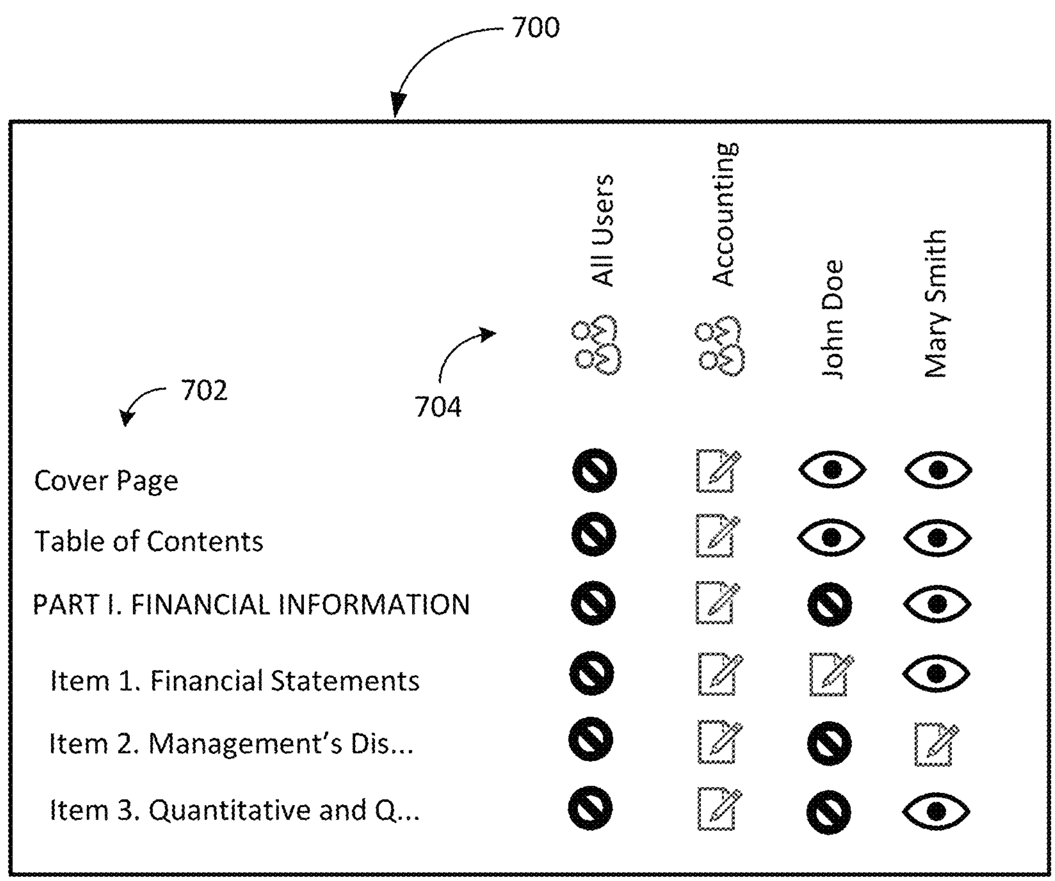

FIG. 7 illustrates a dashboard that allows a user to establish permissions in accordance with an embodiment.

DESCRIPTION

Described herein are a method and computing device (also referred to a "first computing device" or "server") that allows a first user (acting through a second computing device, which may also be referred to as a "first client device") belonging to a first workspace to share a set of data with a second user (acting through a third computing device, which may also be referred to as a "second client device") belonging to a second workspace. When the data is updated by the first user, the update is "gated" (not displayed to the second user) until at least the following conditions are met: (1) the first user republishes the data, and (2) the second user "accepts" the data update. For example, once the first user republishes the update (via the first client device), the system may: provide an on-screen alert on the second client device indicating that an update is available, transmit a message (e.g., text or email) to the second user indicating that an update is available. It is to be understood that reference to a "first" and "second" user is only meant to be illustrative and that there may be any number of users (and any number of workspaces) involved.

In an embodiment, a first computing device (e.g., a server) that is in communication with a second computing device (e.g., a first client device) and a third computing device (e.g., a second client device), a method for gating data between workspaces involves receiving, from a first user (also referred to as the "producer" of a data set) via the second computing device, a request to share a set of data (e.g., text and/or numerical values of spreadsheet or other document) with a second user (also referred to as the "consumer" of the data set); copying the set of data from a first data structure to a second data structure, wherein the first data structure is accessible by the first user but not by the second user and the second data structure is accessible by the second user but not by the first user (e.g., the first and second users are members of different workspaces on a cloud-based productivity platform); receiving, from the second user via a second computing device, a request to display the set of data; in response to the request from the first user and the request from the second user, displaying the set of data on the third computing device, wherein the displayed set of data includes a value; receiving, from the first user via the second computing device, an update of the value; receiving, from the second user via the third computing device, an acceptance of the update; and in response to the received acceptance, displaying the updated value in place of the value on the third computing device.

According to an embodiment, displaying the value comprises displaying the value as a read-only value, and displaying the updated value comprises displaying the updated value as a read-only value.

In an embodiment, the method further includes displaying a document on the second computing device, wherein receiving a request to display the set of data comprises receiving the first user's selection of the set of data from within a document being displayed on the second computing device.

According to an embodiment, the method further includes displaying a document on the third computing device, wherein receiving a request to display the second set of data from the second user comprises receiving the second users selection of a location within the document in which to display the data set In an embodiment, the method further includes alerting the second user via the third computing device that the value has been updated (e.g., displaying a notification via an application being used to display the document on the third computing device).

According to an embodiment, the method further includes displaying, to the second user on the third computing device, a list of available versions of the set of data; and receiving, from the second user via the third computing device, a selection of one of the available versions, wherein the displayed updated value is a value from the selected available version.

Figure 1:
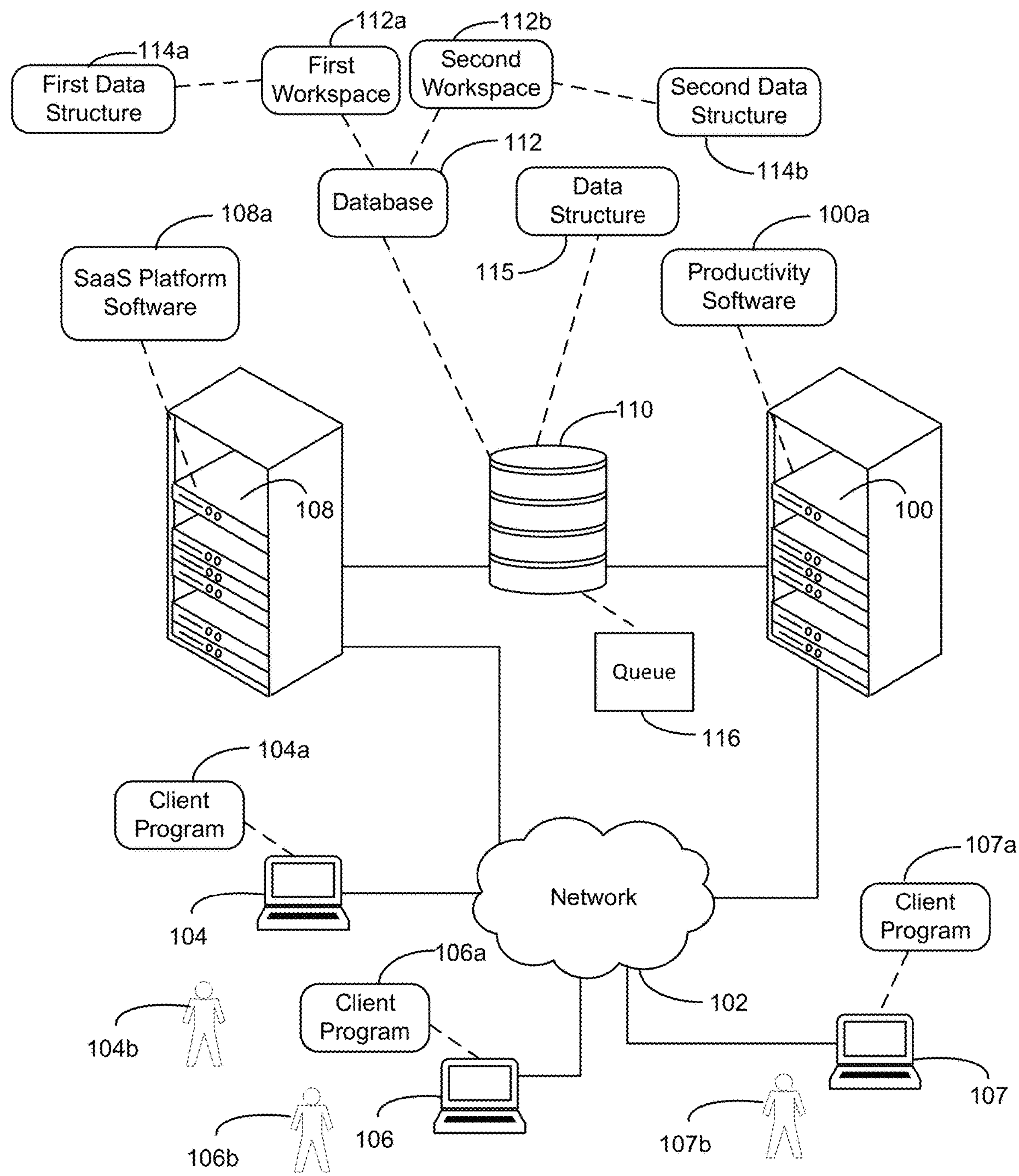
FIG. 1 is a block diagram illustrating an example networking environment in which various embodiments of the disclosure may be employed.

Various embodiments of the disclosure are implemented in a computer networking environment. Turning to FIG. 1, an example of such an environment is shown. A first computing device 100 (e.g., a hardware server device ("server") or a cluster of hardware server devices) is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104 (e.g., a first client device), a third computing device 106 (e.g., a second client device), a fourth computing device 107 (e.g., a third client device), and a fifth computing device 108 (e.g., a server or a cluster of servers). For the sake of the various examples described herein, a first user **104*b* is assumed to operate the second computing device 104, a second user 106*b* is assumed to operate the third computing device 106, and a third user 107*b* is assumed to operate the fourth computing device 107. It should be noted that the networking environment may include any number of computing devices (e.g., hundreds of client devices) and the number depicted in FIG. 1** is meant only to be representative.

It is to be understood that various embodiments may be carried out on the first computing device 100, the second computing device 104, the third computing device 106, the fourth computing device 107, or other computing devices not depicted, with one or more of the second computing device 104, the third computing device 106, and the fourth computing device 107 accessing the first computing device 100 via client programs (labeled **104*a*, 106*a*, and 107*a* respectively), such as thin, web-based clients. In an embodiment, the first computing device 100 executes productivity software 100*a* (e.g., a document editing application, a spreadsheet application, etc.) and the fifth computing device 108 executes software-as-a-service ("SaaS") platform software 108*a*. The first computing device 100 and the fifth computing device 108 are communicatively linked to a media storage device 110 (e.g., a memory or a redundant array of independent disks). Although FIG. 1 depicts the media storage device 110 as a single device, in fact, the media storage device 110** may be implemented as a single computing device or as multiple computing devices working together, and may represent a cloud storage service including multiple storage devices.

In another embodiment, the productivity software **100*a* and the SaaS platform software 108*a* execute on the same computing device (e.g., the first computing device 100 or the fifth computing device 108). For example, the productivity software 100*a* could reside on one partition of the first computing device 100 while the SaaS platform software 108*a* could reside on another partition of the first computing device 100. In other embodiments, portions of the productivity software 100*a* execute on both the first computing device 100 and one or more of the second, third, and fourth computing devices 104, 106, and 107 and/or portions of the SaaS platform software 108*a* may be executed on both the first computing device 100 and the fifth computing device 108. With such network configurations, the second computing device 104, the third computing device 106, and the fourth computing device 107 are configured to access the computing device or devices on which the productivity software 100*a*** resides.

Stored on the media storage device 110 is a database 112, which is maintained by the SaaS platform software **108*a*, but whose operations are controlled by the productivity software 100*a*, which issues instructions to read from, write to, and modify the contents of the database 112 via the SaaS platform software 108*a*. The database 112 includes two or more "workspaces," including a first workspace 112*a* and a second workspace 112*b*. Each workspace is accessible to different groups of users. Thus, users who are members of the first workspace 112*a* but not members of the second workspace 112*b* may not access data that is in the second workspace 112*b*. Conversely, users who are members of the second workspace 112*b* but not members of the first workspace 112*a* may not access data that is in the first workspace 112*a*. For use in various examples set forth hereinafter, it will be assumed that the first workspace 112*a* includes a first data structure 114*a* while the second workspace 112*b* includes a second data structure 114*b*. Also on hosted on the database is a data structure 115 that exists outside of both the first workspace 112*a* and the second workspace 112*b*. The data structure 115 maintains a list of published data sets. The data structure 115 also maintains, for each published data set, a list of users who have access to the data set. Additionally, for each published data set, the data structure 115 includes a pointer to the last published update to the data set. It should be noted that shared data is not copied to the data structure 115. Instead, the data structure 115 acts as an intermediary for communication between the first workspace 112*a* and the second workspace 112*b***. Thus, for example, when the second user requests an update the system looks to the table, sees if there is a new revision available and if there is then the system goes and copies from the first data structure at that revision.

Figure 2:
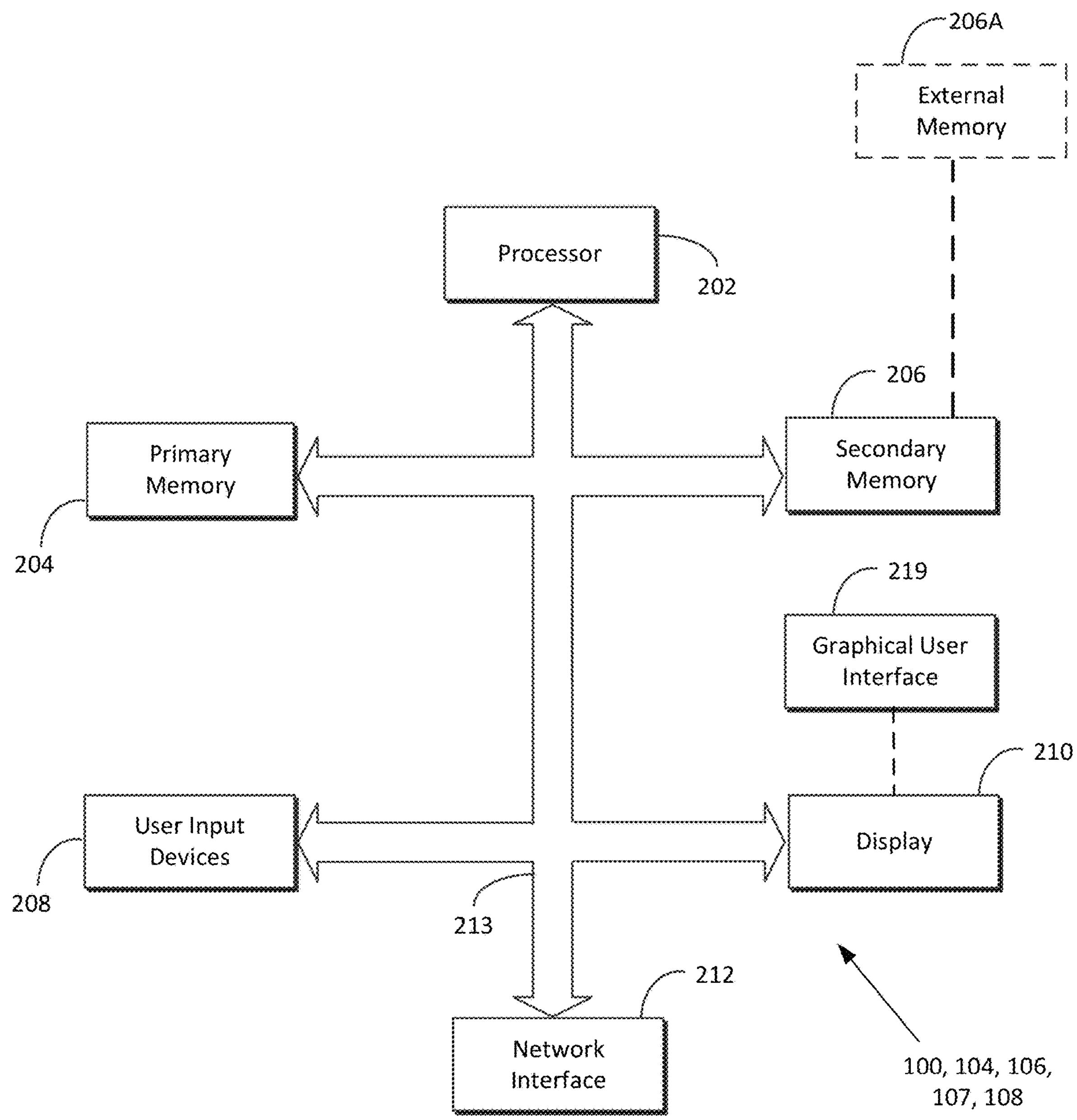
FIG. 2 is a block diagram of a computing device, according to an embodiment.

In one implementation, one or more of the computing devices of FIG. 1 (including the media storage device 110) have the general architecture shown in FIG. 2. The computing device of FIG. 2 includes processor hardware 202 (e.g., a microprocessor, controller, or application-specific integrated circuit) (hereinafter "processor 202"), a primary memory 204 (e.g., volatile memory, random-access memory), a secondary memory 206 (e.g., non-volatile memory), user input devices 208 (e.g., a keyboard, mouse, or touchscreen), a display device 210 (e.g., an organic, light-emitting diode display), and a network interface 212 (which may be wired or wireless). Each of the elements of FIG. 2 is communicatively linked to one or more other elements via one or more data pathways 213. Possible implementations of the data pathways 213 include wires, conductive pathways on a microchip, and wireless connections. In an embodiment, the processor 202 is one of multiple processors in the computing device, each of which is capable of executing a separate thread. In an embodiment, the processor 202 communicates with other processors external to the computing device in order to initiate the execution of different threads on those other processors.

Referring still to FIG. 2, the memories 204 and 206 store instructions executable by the processor 202 and data. The term "local memory" as used herein refers to one or both the memories 204 and 206 (i.e., memory accessible by the processor 202 within the computing device). In some embodiments, the secondary memory 206 is implemented as, or supplemented by an external memory 206A. The media storage device 110 is a possible implementation of the external memory 206A. The processor 202 executes the instructions and uses the data to carry out various procedures including, in some embodiments, the methods described herein, including displaying a graphical user interface 219. The graphical user interface 219 is, according to one embodiment, software that the processor 202 executes to display a report on the display device 210, and which permits a user to make inputs into the report via the user input devices 208.

This disclosure will sometimes refer to one or more of the client program **104*a*, the client program 106*a*, the productivity software 100*a*, the first computing device 100, the second computing device 104, and the third computing device 106 as taking one or more actions. It is to be understood that such actions may involve one or more of the client program 104*a*, the client program 106*a*, and the productivity software taking such actions as: (a) the client program transmitting hypertext transport protocol commands such as "Get" and "Post" in order to transmit to or receive information from the productivity software 100***a* (e.g., via a web server), and (b) the client program running a script (e.g., JavaScript) to send information to and retrieve information from the productivity software 100*a*. The productivity software 100*a* may ultimately obtain information (e.g., web pages or data to feed into plugins used by the client programs) from the database 112 or the SaaS platform software 108*a*.

Turning to FIG. 3A, an example of how a user shares a data set with another user according to an embodiment will now be described. In this example, the first workspace 112*a* is the workspace of the finance team of a fictional corporation—the ABC Corporation, and the second workspace 112*b* is the workspace of the investor relations team of the same corporation. The first user 104*b* interacts with a user interface 300 via the second computing device 104 to assemble an income statement 302, which is in the form of a spreadsheet. In this example, the value in the cell 304 is stored in the first data structure 114*a* in the first workspace 112*a*. The various other values in the spreadsheet 300 may themselves be represented by other data structures in the first workspace 112*a*.

Figure 4A:
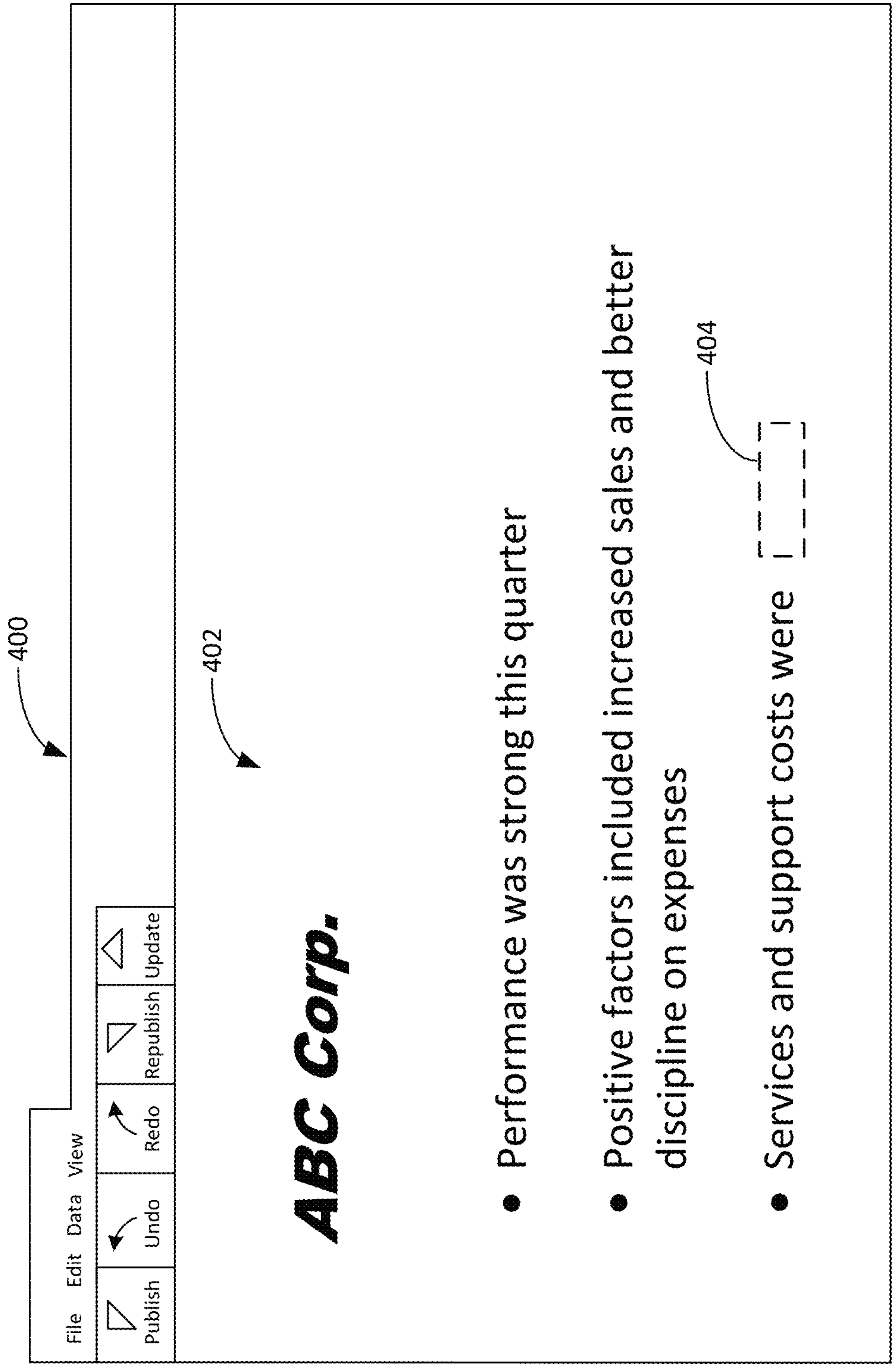

Turning to FIG. 4A, the second user 106*b* interacts with a user interface 400 via the third computing device 106 to create a presentation 402. The second user 106*b* needs to get the number for services and support for June 2013 (which is in cell 304 of the spreadsheet 302) in order to populate a location 404 on the presentation 402. The second user 106*b* contacts the first user 104*b* to request a copy of the income statement 300. The first user 104*b* does not want to share the entire spreadsheet 300 but would like to provide the number to the second user 106*b* and, knowing that the number may change, give the second user 106*b* the opportunity to receive updates to the number. To do so, the first user 104*b* "publishes" the value in the cell 304 to the second user 106*b* by, for example, activating (e.g., mouse clicking) the button 306 of the user interface 300. As shown in FIG. 3B, this action causes the second computing device 104 to display a dialog box 308 on the user interface 300, which prompts the first user 104*b* to enter a name for the data being published (Income Statement Q3 in this example) and to select the person to whom the data is to be published (Jane Doe, who is the second user 106*b* in this example).

Figure 4B:
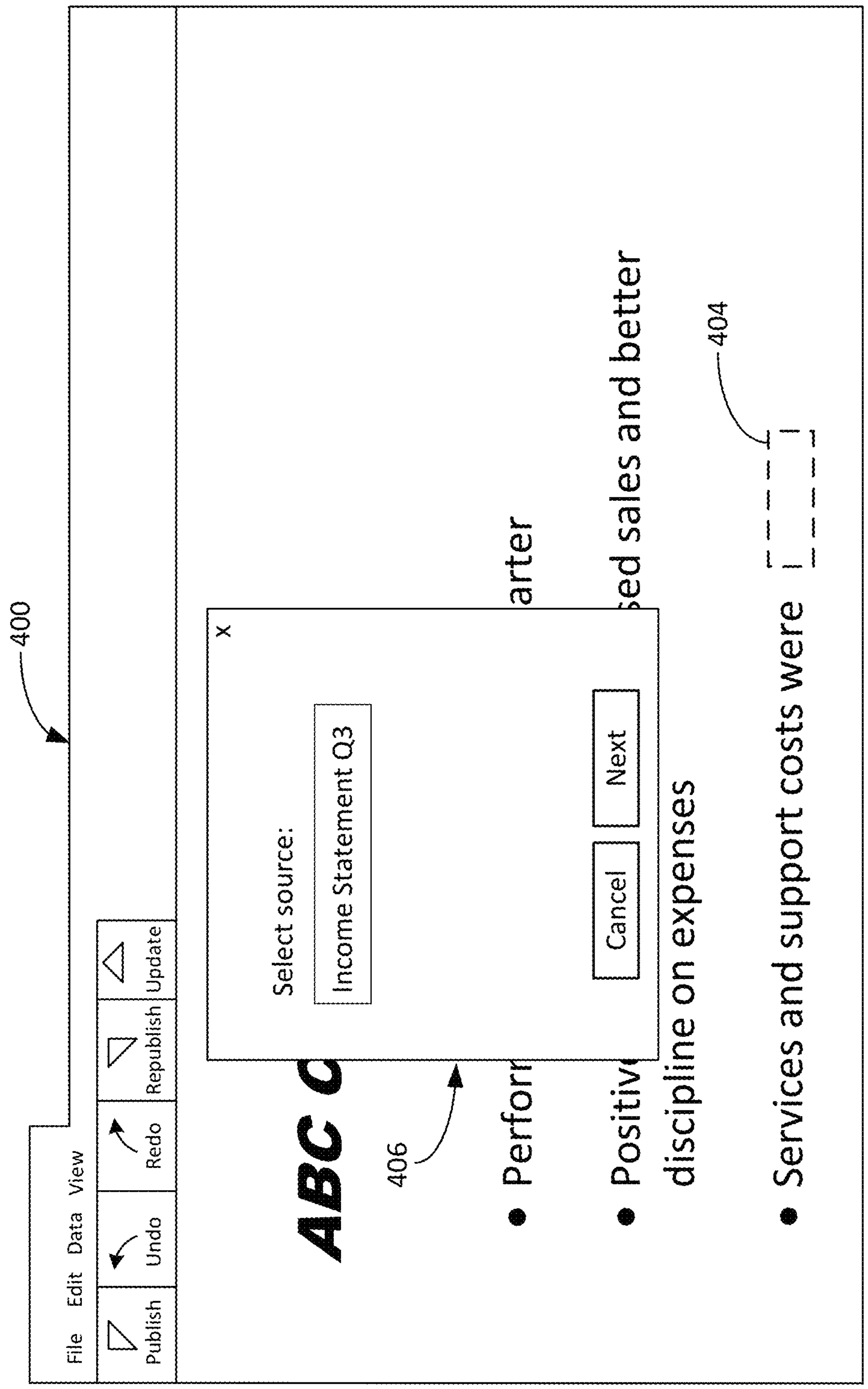
Figure 4C:
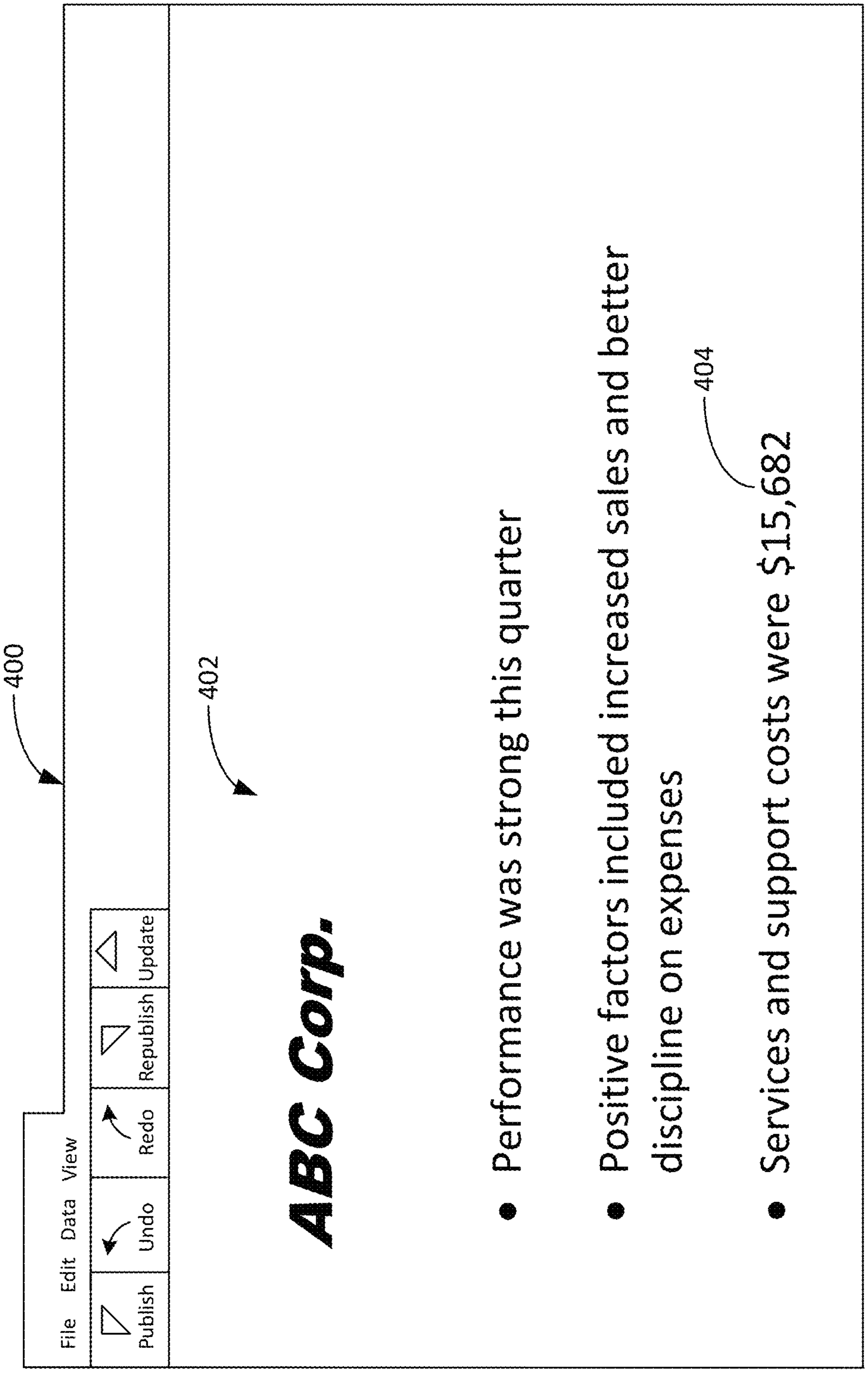

In response to this input by the first user 104*b*, the productivity software 101 copies the value contained in the first data structure 114*a* to the second data structure 114*b*. The productivity software 101 may inform the second user 106*b* that data has been shared (e.g., via email or in-application messaging) but in this example the second user 106*b* highlights the location 404, navigates through a menu to bring up a dialog box 406, as shown in FIG. 4B. The dialog box 408 lists data sets that have been shared with the second user. The second user 106*b* selects the data set "Income Statement Q3." In response, the productivity software 101 displays the value in the second data structure 114*b* (i.e., the value copied from the first data structure 114*a*) at the location 404. Note that a data set may contain multiple values, including numeric values and text. For example, a data set could be multiple rows and columns of a spreadsheet containing text and numbers.

Continuing with the example, the first user 104*b* determines that the value in the cell 304 is incorrect and updates the value. The productivity software 101 does not update the corresponding value in the second user's presentation 402 but instead "gates" the update—that is the productivity software 101 waits for the appropriate condition or conditions to occur before propagating the update to the presentation 402. The conditions in this example are (1) the first user 104*b* needs to "republish" the value and (2) the second user 106*b* needs to "accept" the update to the second value.

Figure 4D:
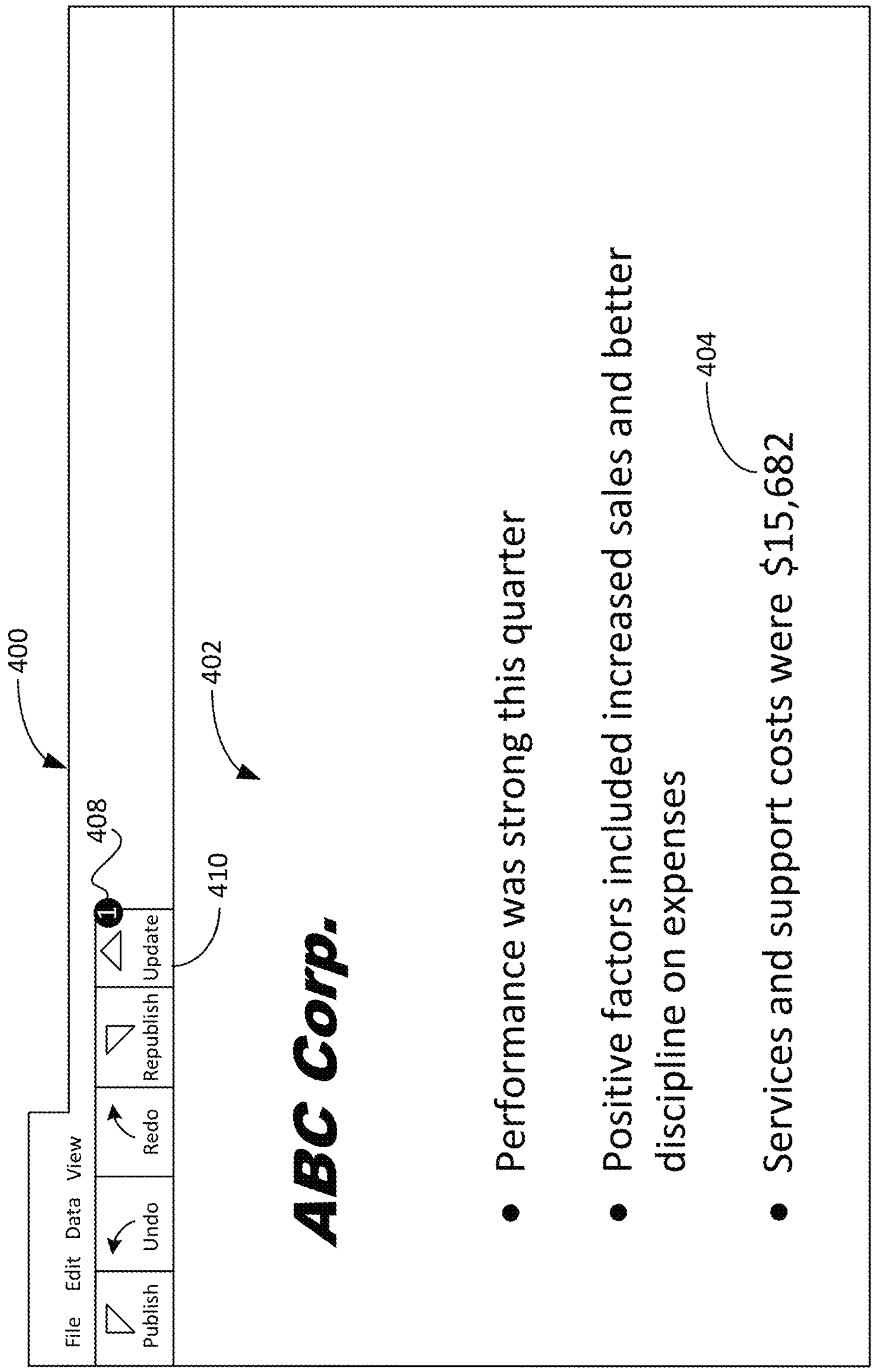
Figure 4E:
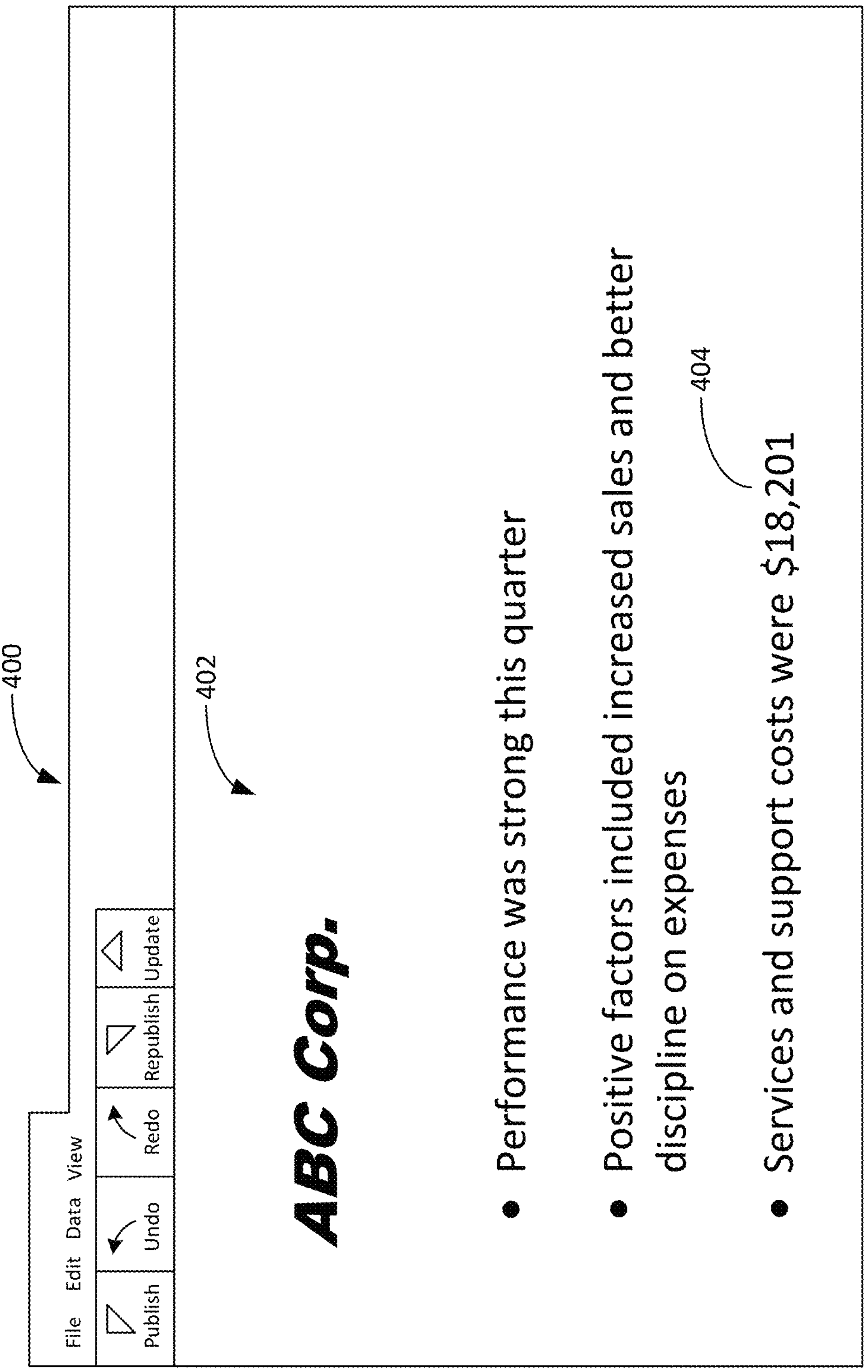
Figure 4F:
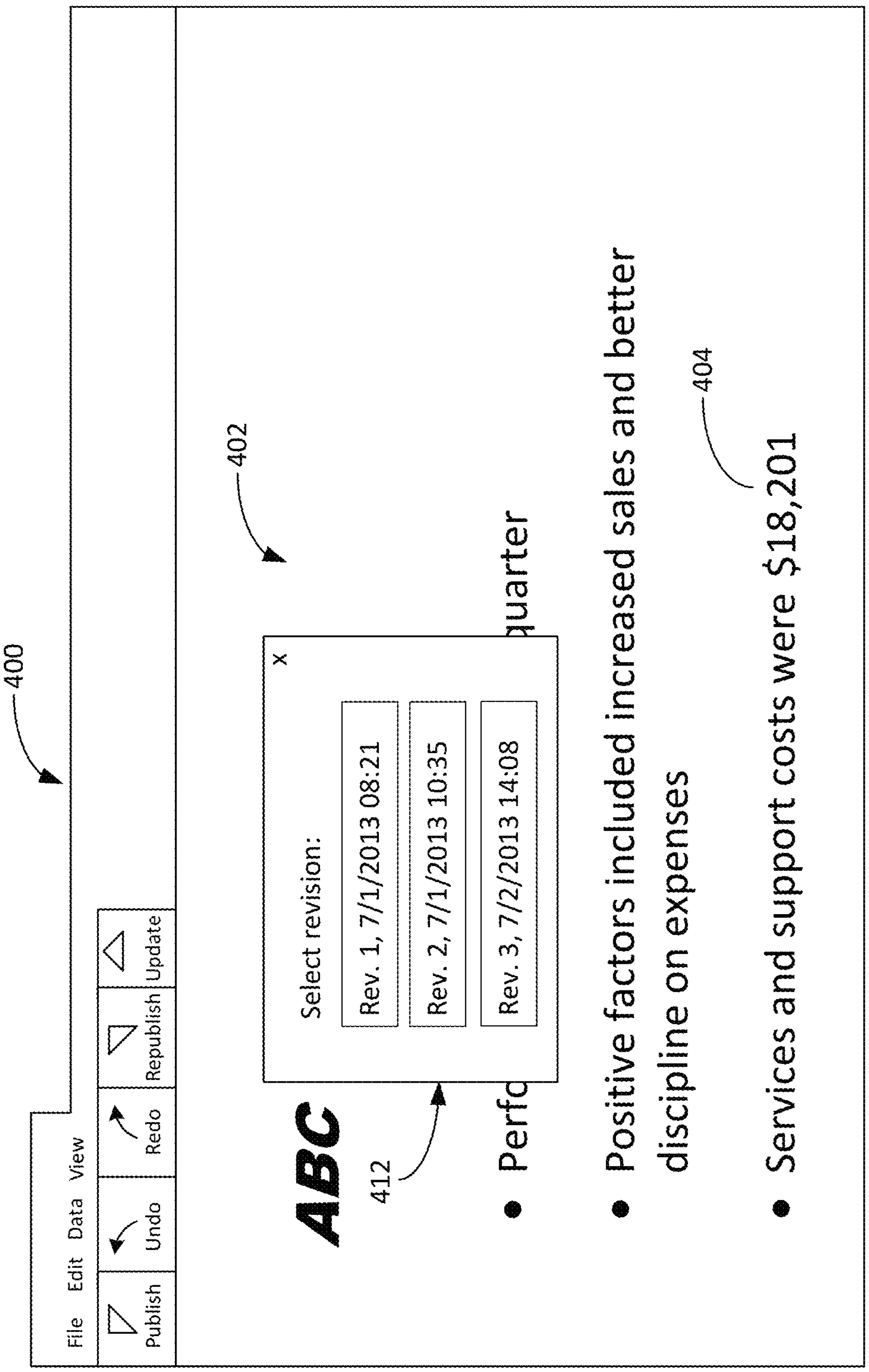

In this example, the first user 104*b* republishes the value (e.g., by activating the republish button 310). The productivity software 101 responds by clearing out the previous value from the second data structure 114*b*, inserting the new value (copied from the first data structure 114*a*), and messaging the second user 106*b* regarding the update—in this case by showing a notification 408 on an "update" button 410 located on the user interface 400 (FIG. 4D). When the second user 106*b* activates the button 410, the productivity software 101 responds by changing the value in the location from a first value to a second value (i.e., to the updated value) (FIG. 4E).

In an embodiment, the user interface presented by the first computing device 100 allows a user to see how many updates to (i.e., revisions of, versions of) the data set there has been. For example, in the previously described scenario, the second user 106*b* could, using the user interface 400, activate a menu and/or dialog box to request information about the data set and, in response, receive the time, date, and revision number of the value received from the first user 104*b*. In some embodiments, a user can (using the using interface) request that a data set be reverted to a previous version, which the first computing device 100 would honor by changing the value or values in the data set (e.g., within the data structure or structures in the consumer's workspace) to that of a prior version. Furthermore, in some embodiments, the second user can carry out other operations using the shared data set, such as referencing the shared data set in a formula.

According to an embodiment, the second user 106*b* can share the data set with one or more other users, such as the third user 107*b*. In such, case the process for gating the sharing process, both on the provider and the consumer side, can be the same as the first user to second user sharing process described previously.

In an embodiment, a user can monitor the data sets that the user has shared out with other users and can monitor the outstanding data connections to the shared data set. Turning to FIG. 5, a history panel that the first computing device 100 presents (e.g., to the second computing device 104 and/or to the third computing device 106) will now be described. The history panel, generally labeled 500, includes a list 502 of data sets that the user has shared, along with a corresponding list 504 of documents to which the data sets have been linked, a corresponding list 506 of users with whom the data sets have been shared (i.e., users who have created active links from the data sets to other documents), and a corresponding list 508 of dates on which the links were created.

According to an embodiment, the user (who has owner permissions to the data sets) can unshare one or more data sets, resulting in a break in the link between the data set and a document to which the data set was linked. Referring again to FIG. 5, in an embodiment, the user accomplishes via a drop down menu 510 (e.g., presented via a client program such as the first client program 104*a* or the second client program 106*a*). In an embodiment, when a user unshares data, the data does not get deleted from any client computing devices. Instead, the client computing devices retain all of the data from their last update and just receive a notification (e.g., from the first computing device 100) that the connection is broken or does not exist anymore.

Although described in the context of the producer (e.g., first user 104*b*) and consumer (e.g., second user 106*b*) being in different workspaces, the techniques previously described may also be employed where the producer and consumer are members of the same workspace, In an embodiment, the second user 106*b* can further share the data set that was originally shared by the first user 104*b* via the same process. For example, the second user (via the third computing device 106) would send a request to the first computing device 100 to share the data set with the third user 107*b*. The first computing device 100 would then copying the set of data from the second data structure 114*b* to a third data structure (not shown), This scenario assumes that the second data structure 114*b* would be accessible by the second user 106*b* but not by the third user 107*b*. Conversely, this scenario assumes that the third data structure would be accessible by the third user 107*b* but not by the second user 106*b*. The third user 107*b* would (via the fourth computing device 107) send the first computing device 100 a request to display the set of data. In response, the first computing device 100 would display the set of data on the fourth computing device 107 (including the value being shared). When the second user 106*b* updates the value (sends the update to the first computing device 100), the first computing device 100 transmits a notification of the update to the fourth computing device 107. Once the third user 107*b* accepts the update, the first computing device 100 displays the updated value on the fourth computing device 107.

An example of a permissioning scheme configured according to an embodiment will now be described. Conventional permissioning schemes are strictly hierarchical in that permission to the top level of an object (e.g., a folder or document) automatically propagates to sub-levels of the object (e.g., subfolders and files within the folder or subsections of the document). According to an embodiment, a computing device refrains from propagating permission down through sub-levels of an object, but rather grants permissions to specific sub-levels (or sets of sublevels) based on specific user-defined settings. Turning to FIG. 6, in an embodiment, there is a top-level folder 602, which has a first sub-folder 604. The first sub-folder 604 has a second sub-folder 606. The second sub-folder 606 includes a spreadsheet 608 and a text document 610. The text document 610 includes a first section 612 and a second section 614. The first section 612 has a sub-section 616. This particular folder and file configuration is merely illustrative and it is to be understood that there may be many different possible folder configurations and section/sub-section configurations, and that the techniques being illustrated can apply to purely folder configurations, purely section/subsection configurations, or any combination thereof.

In this example, there is a first user 618, a second user 620, a third user 622, and a fourth user 624. The first computing device 100 (e.g., in response to input from a user with the appropriate permissions) grants the various users access to the different objects, and can do so on an object-by-object basis, thereby overriding any sort of inherency rules. Specifically, the first computing device 100 grants the first user 618 owner access to the top-level folder 602 and the first sub-folder 604, but only grants the first user 618 editor access to the second sub-folder 606 and everything below the second sub-folder 606.

The first computing device 100 grants the second user 620 editor access to the top-level folder 602 and the first sub-folder 604, but does not grant any access to objects below the first sub-folder 604, with one exception: the computing device grants the second user 620 edit permission to the sub-section 616. For example, assume that the 10K document is not meant to be accessed by employees prior to it filed unless such employees need to provide input into the document. Further assume that the organization needs the second user 620 to provide a very discrete piece of information in the sub-section 616.

Continuing the example, the first computing device 100 grants the third user 622 editor access to the first sub-folder 604 but grants owner access the second sub-folder 606 and everything below the second sub-folder 604. Finally, the first computing device 100 grants the fourth user 624 view-only access to the top-level folder 602 and everything below the top-level folder 602.

Turning to FIG. 7, a dashboard that the first computing device 100 presents (e.g., to the second computing device 104, the third computing device 106, and/or the fourth computing device 107) in order to allow a user to establish permissions in accordance with an embodiment will now be described. The dashboard 700 is structured as a grid, with names of objects on the leftmost column 702 and names of users along the uppermost row 704. By interacting with an icon at the appropriate intersection of row and column, a user with sufficient rights can set permissions to the different users. In an embodiment, selecting and activating (e.g., double clicking) the appropriate icon, a user can pull up a history of changes in permissions for a particular user with regard to a particular object (e.g., folder, sub-folder, document, or section).

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described herein can be reordered in ways that will be apparent to those of skill in the art.

What is claimed is:

1. On a server device that is in communication with a first client device and a second client device, a method for gating data between workspaces, the method comprising:

displaying a first document on the first client device;

displaying a set of data on the first client device, wherein the displayed set of data includes a value;

receiving, from a first user via the first client device, the first user's selection of the set of data from within the first document;

receiving, from the first user, a request to share the selected set of data with a second user;

copying the set of data from a first data structure to a second data structure, wherein the first data structure is accessible by the first user but not by the second user and the second data structure is accessible by the second user but not by the first user;

displaying a second document on the second client device;

receiving, from the second user via the second client device, a request to display the set of data on the second client device and the second user's selection of a location within the second document in which to display the set of data;

in response to the request from the first user and the request from the second user, displaying the set of data on the second client device, including the value, at the selected location within the second document;

receiving, from the first user via the first client device, an update of the value;

displaying, on the second client device, a notification of the update;

receiving, from the second user via the second client device, an acceptance of the update;

in response to the received acceptance, displaying the updated value in place of the value on the second client device;

receiving, from the first user via the first client device, a request to break a connection between the value and the second user; and in response to the received request to break the connection between the value and the second user, ceasing to display updates to the value on the second client device.

2. The method of claim 1, wherein displaying the value comprises displaying the value as a read-only value, and wherein displaying the updated value comprises displaying the updated value as a read-only value.

3. The method of claim 1, further comprising displaying, to the second user on the second client device, a list of available versions of the set of data.

4. The method of claim 3, further comprising receiving, from the second user via the second client device, a selection of one of the available versions, wherein the displayed updated value is a value from the selected available version.

5. The method of claim 1, wherein the set of data is one of a plurality of sets of data that the first user has shared, the method further comprising displaying, to the first user on the first client device, a list of the plurality of sets of data.

6. The method of claim 1, further comprising:

receiving, from the second user via the second client device, a request to share a set of data with a third user;

copying the set of data from the second data structure to a third data structure, wherein the second data structure is accessible by the second user but not by the third user and the third data structure is accessible by the third user but not by the second user;

receiving, from the third user via a third client device, a request to display the set of data;

in response to the request from the second user and the request from the third user, displaying the set of data on the third client device, wherein the displayed set of data includes the value;

receiving, from the second user via the second client device, an update of the value;

receiving, from the third user via the third client device, an acceptance of the update; and in response to the received acceptance, displaying the updated value in place of the value on the third client device.

7. The method of claim 1, further comprising:

displaying, on the first client device, a user interface that includes a list of sets of data that the first user has shared, an indication as to when each set of data was shared, and the identities of users who accepted the sets of data shared.

8. The method of claim 1, further comprising receiving, from the second user via the second client device, a request to carry out an operation on the data set associated with the second data structure.

9. A server device that is in communication with a first client device and a second client device, the server device configured to:

display a first document on the first client device;

display a set of data on the first client device, wherein the displayed set of data includes a value;

receive, from a first user via the first client device, the first user's selection of the set of data from within the first document;

receive, from the first user, a request to share the set of data with a second user;

copy the set of data from a first data structure to a second data structure, wherein the first data structure is accessible by the first user but not by the second user and the second data structure is accessible by the second user but not by the first user;

display a second document on the second client device;

receive, from the second user via the second client device, a request to display the set of data on the second client device and the second user's selection of a location within the second document in which to display the set of data;

in response to the request from the first user and the request from the second user, display the set of data on the second client device, including the value, at the selected location within the second document;

receive, from the first user via the first client device, an update of the value;

display, on the second client device, a notification of the update;

receive, from the second user via the second client device, an acceptance of the update;

in response to the received acceptance, display the updated value in place of the value on the second client device;

receive, from the first user via the first client device, a request to break a connection between the value and the second user; and in response to the received request to break the connection between the value and the second user, cease to display updates to the value on the second client device.

10. The server device of claim 9, wherein the value is displayed as a read-only value, and wherein the updated value is displayed as a read-only value.

11. The server device of claim 9, further configured to display, to the second user on the second client device, a list of available versions of the set of data.

12. The server device of claim 9, further configured to receive, from the second user via the second client device, a selection of one of the available versions, wherein the displayed updated value is a value from the selected available version.

13. A non-transitory computer-readable medium having stored thereon computer-executable instructions for carrying out actions comprising:

displaying a first document on the first client device;

displaying a set of data on the first client device, wherein the displayed set of data includes a value;

receiving, from a first user via the first client device, the first user's selection of the set of data from within the first document;

receiving, from the first user, a request to share the selected set of data with a second user;

copying the set of data from a first data structure to a second data structure, wherein the first data structure is accessible by the first user but not by the second user and the second data structure is accessible by the second user but not by the first user;

displaying a second document on the second client device;

receiving, from the second user via the second client device, a request to display the set of data on the second client device and the second user's selection of a location within the second document in which to display the set of data;

in response to the request from the first user and the request from the second user, displaying the set of data on the second client device, including the value, at the selected location within the second document;

receiving, from the first user via the first client device, an update of the value;

displaying, on the second client device, a notification of the update;

receiving, from the second user via the second client device, an acceptance of the update;

in response to the received acceptance, displaying the updated value in place of the value on the second client device;

receiving, from the first user via the first client device, a request to break a connection between the value and the second user; and in response to the received request to break the connection between the value and the second user, ceasing to display updates to the value on the second client device.

* * * * *